United States Patent [19]
Cartry

[11] Patent Number: 5,544,205
[45] Date of Patent: Aug. 6, 1996

[54] DEVICE AND METHOD FOR CHECKING THE GUIDE ELEMENTS OF A GUIDE TUBE FOR THE UPPER INTERNALS OF A PRESSURIZED WATER NUCLEAR REACTOR

[75] Inventor: Jean P. Cartry, Lyons, France

[73] Assignee: Framatome, Courbevoie, France

[21] Appl. No.: 347,074

[22] Filed: Nov. 23, 1994

[30]  Foreign Application Priority Data

Nov. 25, 1993 [FR]  France ................................. 93 14119

[51] Int. Cl.⁶ .................................................. G21C 17/00
[52] U.S. Cl. ............................................ 376/245; 376/248
[58] Field of Search ..................................... 376/245, 248, 376/249, 258, 260, 353

[56]  References Cited

U.S. PATENT DOCUMENTS

| | | | |
|---|---|---|---|
| 5,078,955 | 1/1992 | Hydeman et al. | 376/248 |
| 5,404,381 | 4/1995 | Cartry | 376/248 |

FOREIGN PATENT DOCUMENTS

| | | |
|---|---|---|
| 316631 | 5/1989 | European Pat. Off. . |
| 390637 | 10/1990 | European Pat. Off. . |
| 2304149 | 10/1976 | France . |

OTHER PUBLICATIONS

Abstracts of Japan, vol. 11, No. 68, Method and apparatus for inspecting of film on inner surface of heat exchange pipe provided with inner surface coating film, JP 61231404, Oct. 1986.

*Primary Examiner*—Daniel D. Wasil
*Attorney, Agent, or Firm*—Pollock, Vande Sande & Priddy

[57]  ABSTRACT

The device includes an inspection rod cluster (10) comprising a central cylindrical body (45) and a plurality of arms (46, 48) extending radially with respect to the cylindrical body (45). Guide bars (49) for the inspection rod cluster (10) in the guide elements of the guide tube may be fixed to the end of at least two arms (48), opposite the cylindrical body (45), and rotary inspection probes (47) may be fixed to the end of the other arms (46). Preferably, the probes (47) are probes for remote optical measurements by the ladar method.

17 Claims, 10 Drawing Sheets

DEVICE AND METHOD FOR CHECKING THE GUIDE ELEMENTS OF A GUIDE TUBE FOR THE UPPER INTERNALS OF A PRESSURIZED WATER NUCLEAR REACTOR

FIELD OF THE INVENTION

The invention relates to a device for checking the guide elements of a guide tube for the upper internals of a pressurized water nuclear reactor.

BACKGROUND OF THE INVENTION

Pressurized water nuclear reactors include, inside a vessel, the core of the nuclear reactor consisting of prism-shaped assemblies arranged with their axes vertical and, above the core, upper internals which include, a set of vertical guide tubes making it possible to guide the control rods consisting of bundles of rods placed parallel to each other and containing material which absorbs neutrons.

The guide tubes for the upper internals include discontinuous guide elements consisting of flat plates, called guide panels which are pierced with openings, and continuous guide means consisting of sleeves and slit tubes placed in the vertical direction of the tube, the openings of the plates and the bores of the continuous guide means being in positions corresponding to the positions of the absorber rods in the bundle of the control rods.

The openings passing through the guide panels and the bores of the sleeves and of the split tubes constituting the guide elements of the absorber rods have lateral slots connecting them with a free bore at the central part of the guide tube and allowing the passage of a spider assembly of the cluster of parallel absorber rods.

In order to control the reactor by adjusting the reactivity of the core, the clusters of absorber rods are moved in the vertical direction, during the operation of the reactor, such that the absorber rods are introduced to a greater or lesser height inside some assemblies of the core. During their movement in the vertical direction, the absorber rods of the control rods are each guided by a series of aligned openings in the guide panels and by the internal bore of a guide sleeve or a split tube.

After some length of operation of the nuclear reactor, the openings in the guide panels and the bores in the sleeves and split tubes may exhibit wear leading, for example, to ovalization of the cross section of the opening or of the bore, so that the absorber rods are no longer guided satisfactorily.

It is therefore necessary to make periodic measurements and checks on the guide elements of the upper internals of the nuclear reactor, in order to determine whether some of these guide elements need to be replaced or repaired.

The checking of the guide elements must be carried out during a period of shutdown for checking, repairing and/or refuelling the nuclear reactor, during which the upper internals are extracted from the vessel and arranged at the bottom of the cavity of the reactor, on a storage and maintenance stand.

It is necessary to make extremely accurate measurements on the guide elements of the upper internals, insofar as the wear on these guide elements requiring repair or replacement is manifested by small differences between the dimensions of the openings or bores of the guide elements in various transverse directions.

It has been proposed applicant's EP-A-0,390,637, to carry out these checks from comparative measurements of capacitance of capacitors consisting of plates distributed around the axis of a sensor which is moved substantially coaxially inside the guide elements. Preferably, the checking device may be in the form of a cluster similar to a control rod cluster which can be moved inside a guide tube. The absorber rods of the control rod cluster are replaced by axially directed cylindrical bars in two parts, between which a measurement probe consisting of plates of capacitors distributed around the axis of the probe is interposed.

Such a device can be carried by a carrying device moving over the bottom of the reactor cavity, below the upper internals, in line with a guide tube. A mast maneuvered from the upper level of the cavity can be attachment spider assembly of the inspection rod cluster, so as to move the inspection rod cluster in the axial direction inside the guide tube, in the vertical direction and upwards.

It is thus possible to check the guide elements for the upper internals without having to insert the checking device through the top of the internals in position on their inspection stand.

However, the accuracy of the checking obtained by using capacitive measurement probes may be insufficient in certain cases and the processing of the measurements may present some difficulties.

In FR-A-92 09915, a checking device was proposed which includes a mast on which pivoting arms are mounted, constituting supports for rotary probes making it possible to successively fit the rotary probes in each of the guide elements to be checked. Such a device is complex and has moving elements which may be damaged during their use in the reactor cavity.

SUMMARY OF THE INVENTION

The object of the invention is to provide a device for checking the guide elements of a guide tube for the upper internals of a pressurized water nuclear reactor arranged underwater in a cavity, the guide elements including, on the inside guide tubes having a vertical axis in the checking position, guide openings passing through horizontal plates arranged spaced apart from each other in the axial direction of the guide tube and bores of tubular sleeves with vertical axis, the openings and the bores being aligned along a plurality of vertical axial directions and communicating with a central bore of the guide tube, the device including an inspection rod cluster having a spider assembly for attachment to a handling mast, support elements for inspection probes movable axially inside the guide elements of the guide tube, probes each mounted movably in rotation on a support, about an axis parallel to the axis of the guide tube and means for rotating the probes device is extremely accurate, as well as sturdy and simple in form.

The inspection rod cluster includes:
a cylindrical body whose diameter is less than the diameter of the central bore of the guide tube, and
a plurality of radially directed arms fixed around the cylindrical body in determined angular and axial positions and each carrying a rotary measurement probe at its end remote from the cylindrical body.

BRIEF DESCRIPTION OF THE DRAWINGS

In order better to explain the invention, a description will now be given, by way of example, with reference to the attached drawings, of two embodiments of a device according to the invention and its implementation for checking the upper internals of a nuclear reactor.

DETAILED DESCRIPTION

Figure 1:
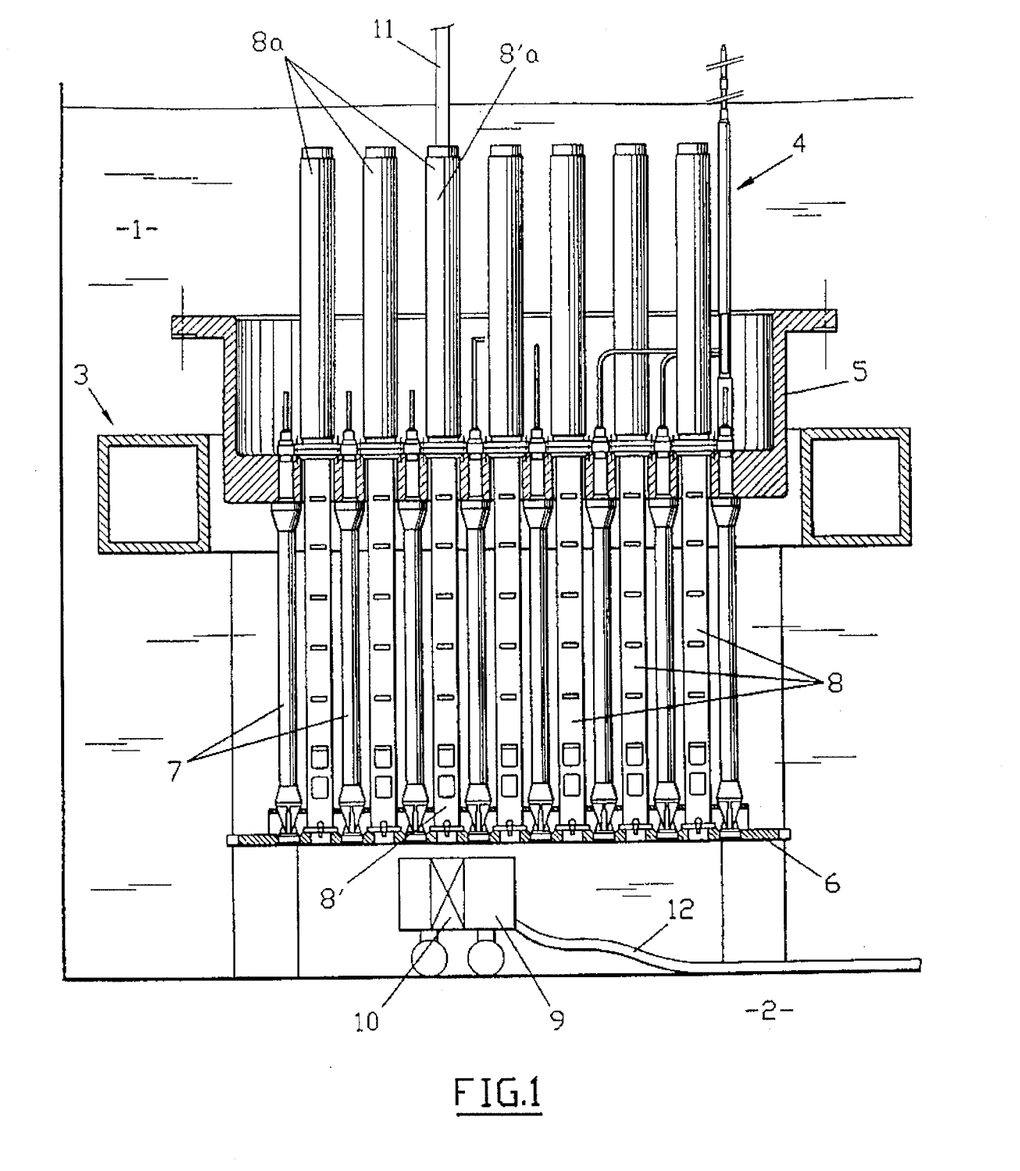
FIG. 1 is a view in elevation of the upper internals of a nuclear reactor in position on a storage stand in a reactor cavity, during an operation of checking the guide elements.

FIG. 1 shows a part of the cavity 1 of a nuclear reactor in which an inspection stand 3 for the internals 4 of the nuclear reactor is arranged.

The upper internals 4 include an upper plate 5 and a lower plate 6 constituting the upper plate of the core of the nuclear reactor, bearing on the upper end of the fuel assemblies when the upper internals 4 are in the service position in the vessel of the reactor.

The internals 4 furthermore include a set of guide tubes 8 connected to the upper plate 5 and to the lower plate 6 of the internals and each including a first part interposed between the upper plate 5 and the lower plate 6 and a second part 8a fixed above the upper plate 5.

Support columns 7 arranged between the plates 5 and 6, parallel to the tubes 8, make it possible to hold the plates 5 and 6 and ensure rigidity of the internals 4.

During a shutdown of the reactor for repair and refuelling, the internals 4 are extracted from the vessel of the reactor and arranged on the storage stand 3, the internals 4 resting via the upper plate 5 on vertical supports of the stand 3.

The cavity 1 is filled with water up to its upper level and the intervention is carried out from a bridge arranged above the upper level of the cavity 1.

The intervention device according to the invention includes an inspection rod cluster 10 which can be moved by a support carriage 9 over the bottom of the cavity and a long mast 11 which can be manipulated from the bridge of the cavity to be fitted inside any guide tube 8 to engage with the inspection rod cluster 10 and move it in the vertical direction and upwards inside the tube 8.

Figure 2:
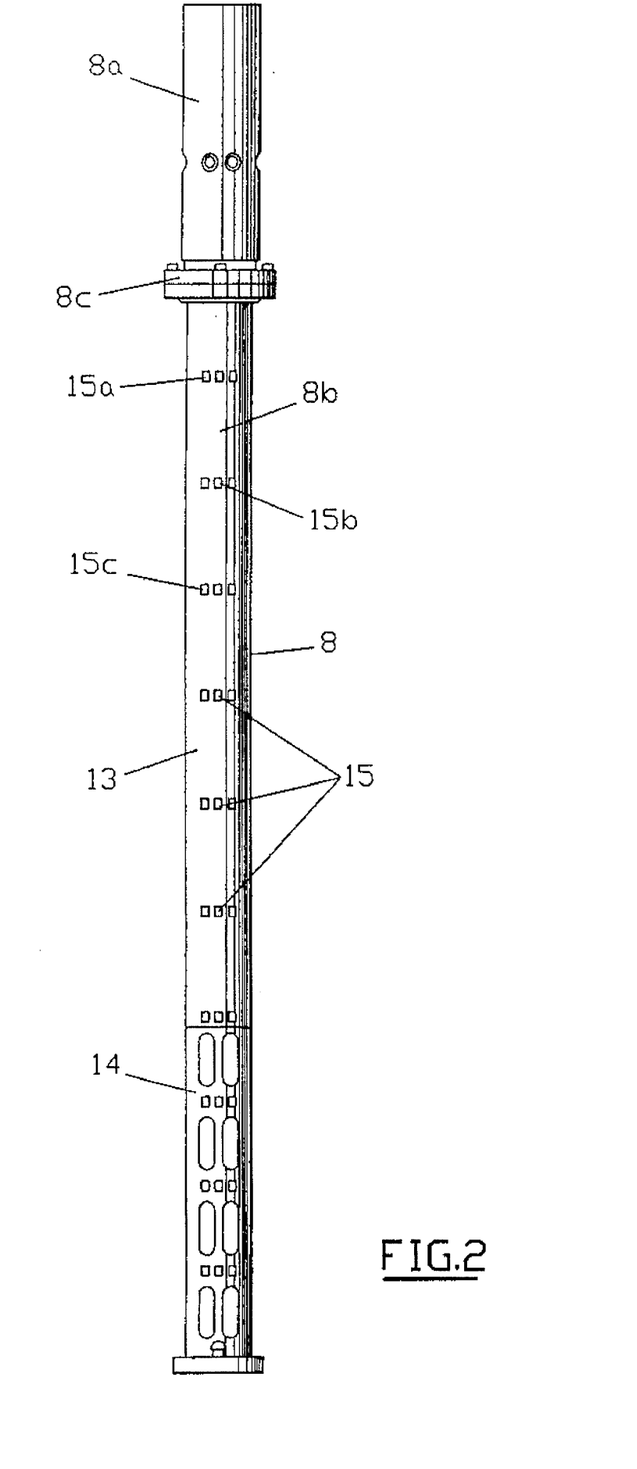
FIG. 2 is a view in elevation of a guide tube for the upper internals represented in FIG. 1.

FIG. 2 shows a guide tube 8 for the internals 4 represented in FIG. 1.

The guide tube 8 includes the upper part 8a and a lower part 8b which are connected together by assembly means 8c comprising flanges fastened to one another by screws.

The upper part 8a of the guide tube 8 is intended to be placed above the upper plate 5 of the upper internals, and the lower part 8b between the upper plate 5 and the lower plate 6.

The two parts 8a and 8b of the guide tube include an outer cylindrical casing which is pierced with openings and which contains the guide elements.

The lower part 8b, which constitutes the main guide part of the tube 8, itself includes an upper part 13 constituting the discontinuous guide part and a lower part 14 constituting the continuous guide part for the control rods.

Figure 3:
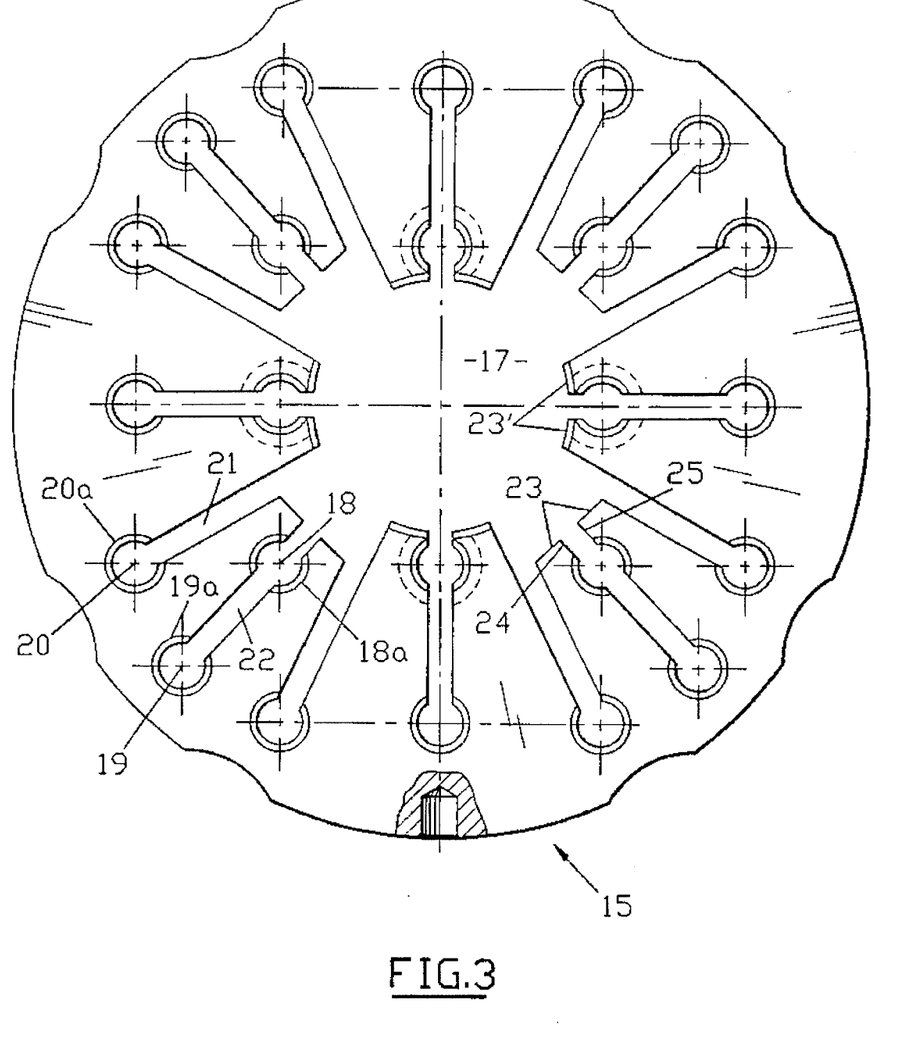
FIG. 3 is a plan view of a guide panel of the guide tube represented in FIG. 2.

In the discontinuous guide part 13, the outer casing of the guide tube 8 contains the guide panels 15 as represented in FIG. 3, in successive locations 15a, 15b, 15c, . . . , regularly spaced along the length of the part 13 of the lower section 8b of the tube 8.

Figure 4:
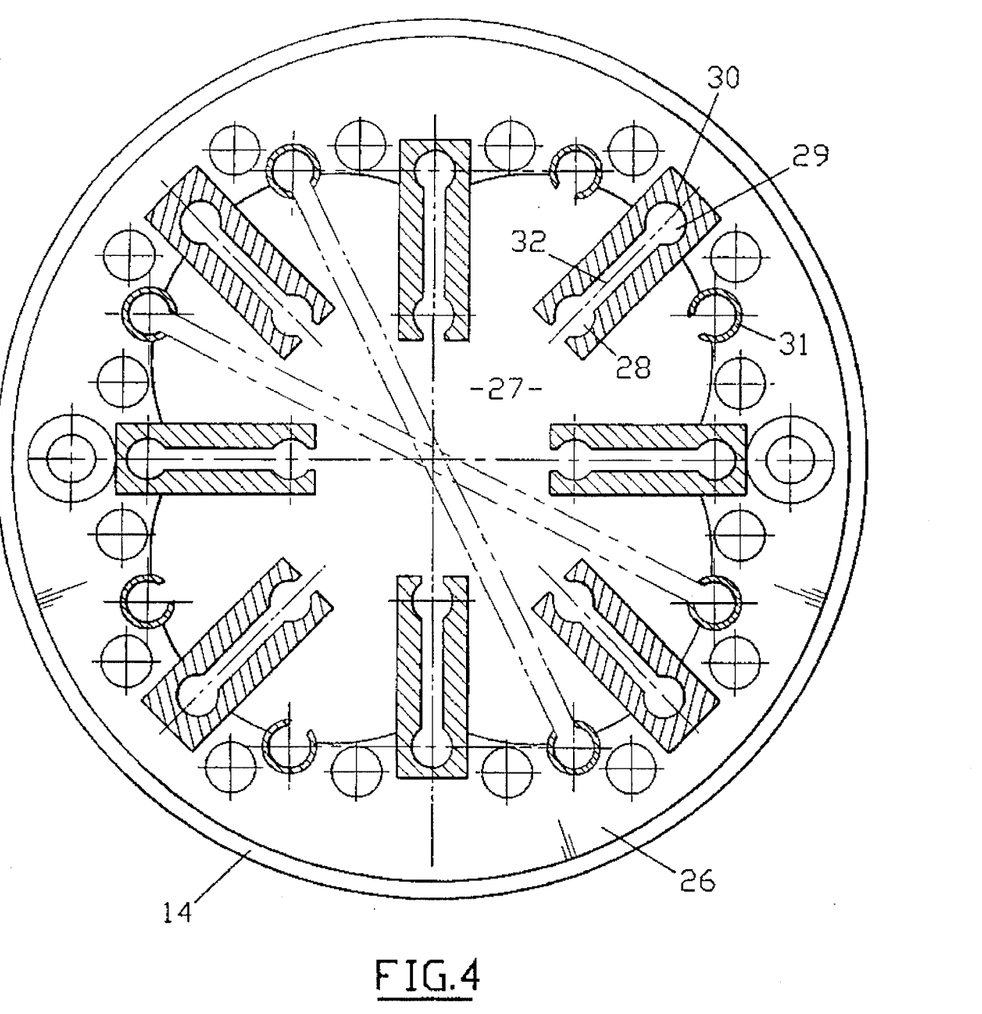
FIG. 4 is a cross-sectional view of the continuous guide elements of the guide tube represented in FIG. 2.

Continuous guide elements as represented in FIG. 4 are arranged along the entire length of the continuous guide part 14 of the lower section 8b of the guide tube.

The discontinuous guide plates or guide panels 15 as represented in FIG. 3 consist of metal plates cut out so as to leave a free space 17 at the central part of the panel 15 and guide openings such as 18, 19, 20 for the absorber rods of the control rod which may be introduced and guided through the guide tube containing the guide panels 15.

The openings such as 20 are arranged at the end of a slot 21 passing through the guide panel 15 and emerging in the central free space 17.

The openings such as 18 and 19 are aligned along a slot 22 also emerging in the central free space 17.

In this manner, all the guide openings 18, 19 and 20 of the guide panel 15 emerge in the central free space 17.

The part of the openings 18 communicating with the central free space 17 has circumferential surfaces 23 or 23' and radially directed surfaces 24 and 25.

Some of these surfaces may be lined with an anti-wear component or layer.

The surfaces such as 23, 23', 24 and 25 which do not undergo significant frictional wear during the use of the control rods can be used as reference surfaces during the checking.

FIG. 4 shows in section the continuous guide part 14 of the guide tube 8 which includes, inside the cylindrical casing of the section 8b of the guide tube, a support 26 including a central axially directed bore defining a free space 27 in extension of the free space 17, inside the guide tube, the free spaces 17 of the guide panels and the free space 27 of the continuous guidance constituting the central bore of the guide tube.

The continuous guide elements are fixed on the support 26 and consist of guide sleeves 30 and slit tubes 31 arranged in the axial direction of the guide tube 6.

Each of the guide sleeves 30 defines two guide bores 28 and 29 which are connected together by a slit 32 and emerge in the free space 27.

The tubes 31 include a slit pointing towards the central free space 27. The guide bores 28 and 29 of the sleeves 30 and the slit tubes 31 all communicate with the central free bore of the guide tube.

The openings 28, 29 and 30 of the guide panels are arranged so as to reproduce, in cross section, the network of the guide tubes of a core assembly of a nuclear reactor, into which guide tubes the absorber rods of a control rod are introduced.

The guide panels 15 are arranged parallel to each other in positions such that the openings of the various successive panels are aligned to constitute axially directed guide channels.

The guide bores 28 and 29 of the sleeves 30 and the bores of the tubes 31 are, also arranged so as to reproduce the network of the guide tubes of an assembly of the nuclear reactor.

The bores of the continuous guide elements are aligned with the series of openings of the guide panels, along the axial guide directions.

Figure 5:
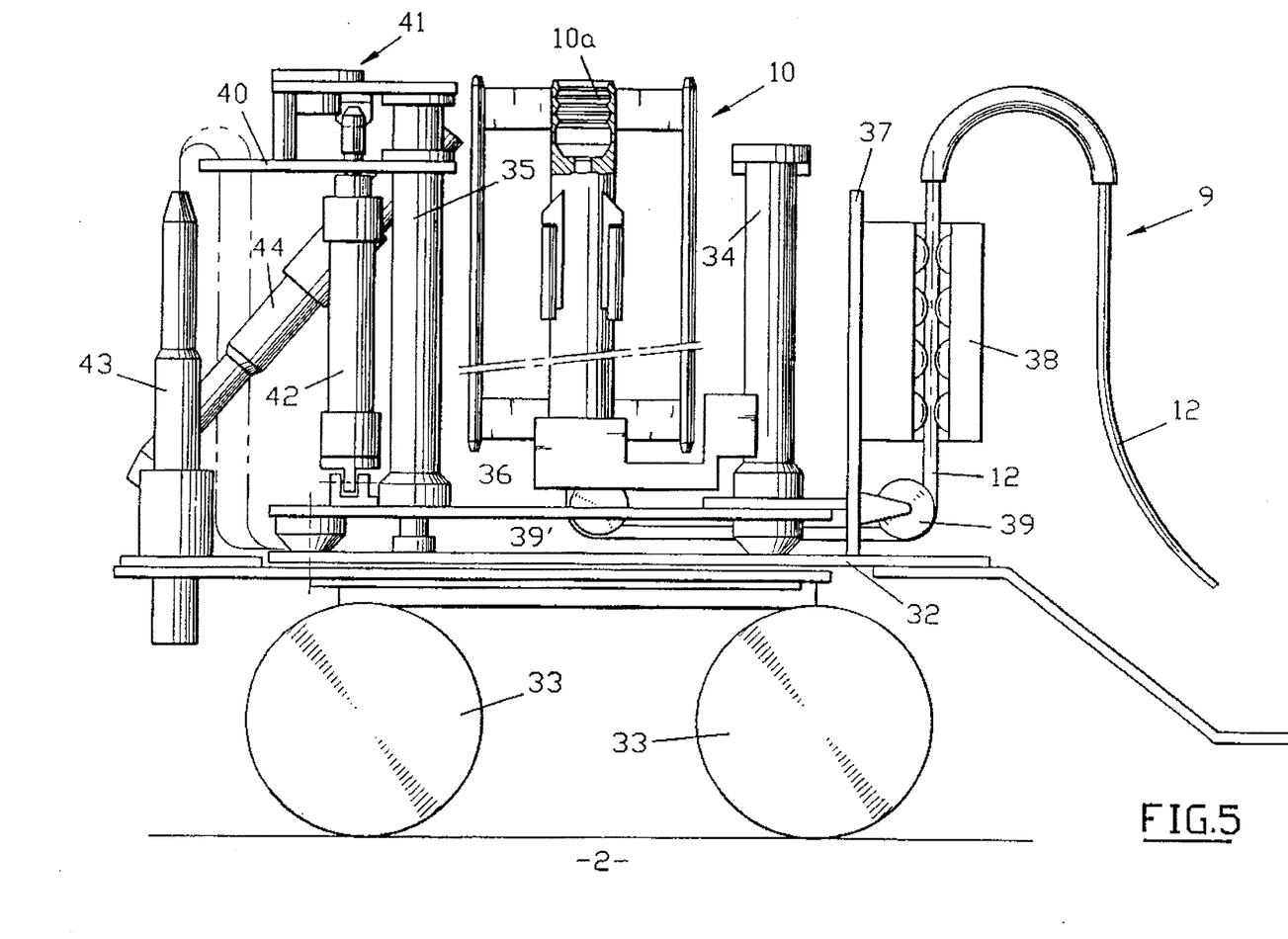
FIG. 5 is a view in elevation of a carriage carrying the inspection rod cluster of the device according to the invention.

FIG. 5 shows, on a larger scale and in more detail, the carriage 9 carrying the inspection rod cluster 10 of the device according to the invention, which can be moved over the bottom 2 of the cavity 1, so as to come into axial extension of any guide tube 8 of the internals 4 in position on their inspection stand 3.

The bearing carriage 9, which is of the type currently used in the scope of maintenance operations inside the cavity of a nuclear reactor, includes wheels 33 resting on the bottom 2 of the cavity and drive means (not shown) making it possible to control, remotely and very accurately, the movements of the support carriage 9 over the bottom of the cavity.

Two vertical columns 34 and 35 are fixed on the platform 32 of the carriage 9.

A support carriage 36 for the inspection rod cluster 10 is mounted movably in the vertical direction on the column 34. The support carriage 36 includes a housing for accommodating the lower part of the inspection rod cluster 10, making it possible to hold it in a vertical position, and drive means for movement along the axial direction of the column 34.

The carriage 9 includes a vertical upright 37 on which a pusher-puller 38 is mounted, making it possible to move, in either direction, a set of cables 12 connected to the inspection rod cluster 10, powering the probes and collecting the measurements, during the movements of the inspection rod cluster 10 inside a guide tube, in either direction. Tension is thus continuously exerted on the set of cables 12 during the movements of the inspection rod cluster 10, which makes it possible to prevent the cables from winding up or folding and blocking the movements of the probe support.

The set of cables 12 is, in addition, guided by pulleys 39 and 39'.

A plate 40 carrying a centering and positioning head 41 for the carriage 9 is slidingly engaged on the column 35. This head is connected to the end of the rod of a jack 42 fixed on the platform of the carriage.

The centering head 41 includes openings which can be engaged, by moving the head 41 in the vertical direction, on fuel assembly positioning studs projecting under the lower plate 6 of the upper internals 4.

The lower plate 6 of the upper internals 4 actually constitutes the upper plate of the core of the reactor which bears on the upper parts of the fuel assemblies of the core and which includes centering and positioning studs intended to engage in openings of the upper adaptors of the fuel assemblies.

When the upper internals 4 are in position on their storage stand, as represented in FIG. 1, the centering studs of the upper plate of the core 6 project at the bottom of the internals, above the bottom 2 of the cavity.

The support carriage 9 may be positioned under the upper internals in a position such that the inspection rod cluster 10 is substantially in line with a guide tube in which it is desired to carry out checks.

The positioning of the support carriage 9 is carried out using a video camera 43 which makes it possible to supply an image of the bottom 2 of the cavity on which are drawn positioning references in the form of a grid corresponding to the position of the guide tubes of the upper internals on their inspection stand.

It is thus possible to stop the support carriage, during its movements under the upper internals, at a location such that the inspection rod cluster 10 is in line with the guide tube in which it is desired to carry out the check.

The precise positioning of the support carriage 9 and of the inspection rod cluster 10 under the upper internals of the reactor is completed by engaging the openings of the centering head 41 on guide studs of the core upper plate, such that the position of the carriage 9 is perfectly fixed with respect to the upper internals.

A video camera 44 makes it possible to verify that the mast for gripping the inspection rod cluster 10 which is introduced into the guide tube from the upper level of the cavity penetrates correctly into the upper part 10a of the inspection rod cluster 10 constituting a spider assembly similar to the spider assembly of a control rod cluster.

The mast for gripping the inspection rod cluster 10 may consist of a rod such as an extender of a control rod cluster, including standard means of assembly with the spider assembly 10a.

Figure 6:
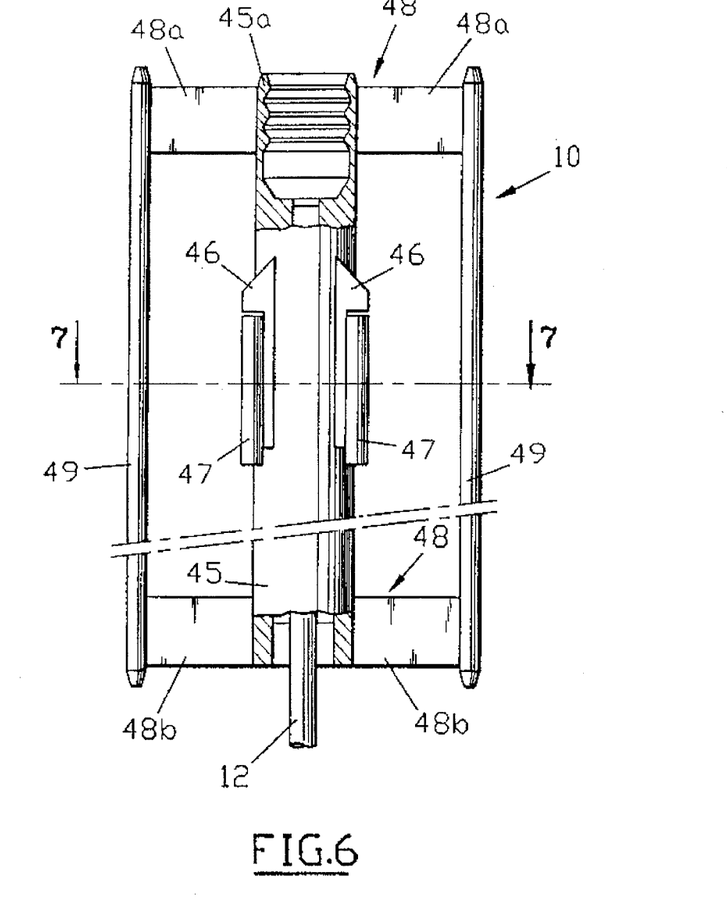
FIG. 6 is a view in elevation of the inspection rod cluster of the device according to the invention.
Figure 7:
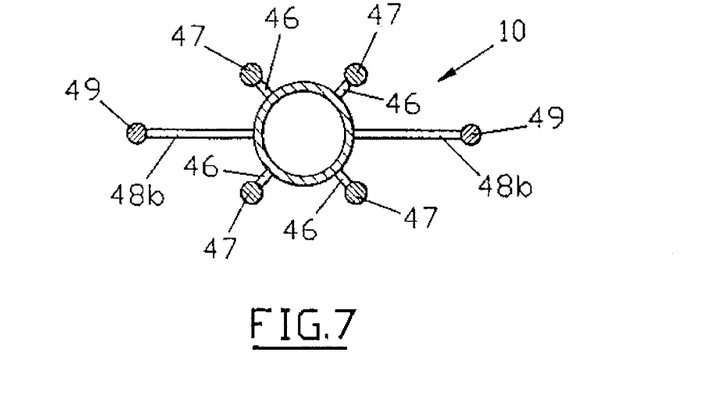
FIG. 7 is a cross-sectional view along line 7—7 in FIG. 6.

FIGS. 6 and 7 show a first embodiment of the inspection rod cluster 10 according to the invention.

The inspection rod cluster 10 includes a body 45 of tubular shape, one end 45a of which is internally machined in an assembly profile of conventional type to constitute the spider assembly 10a similar to the spider assembly of a rod for controlling the reactivity of the core of the nuclear reactor.

The internal profile of the part 45a of the cylindrical body 45 makes it possible to assemble and remotely fasten the end part of a control rod or extender to the inspection rod cluster 10.

Four arms 46 are fixed on the outer cylindrical surface of the cylindrical body 45, radially of the cylindrical body 45 and substantially at 90° to one another around its axis.

A remote measurement probe 47 is mounted at the end of each of the arms 46, in an arrangement parallel to the axis of the cylindrical body 45. The cylindrical probes 47 are mounted for rotation about their axis parallel to the axis of the body 45 or include only a part which can be rotated about their axis.

The set of cables 12 for powering the probes and collecting the measurement signals is engaged axially in the bore of body 45.

The inspection rod cluster 10 furthermore includes radially directed arms 46 used as supports for the measurement probes 47, two pairs of radially directed arms 48, longer than the arms 46, at the ends of which are fixed cylindrical bars 49 constituting means for guiding the inspection rod cluster 10 during its movements inside a guide tube for the upper internals.

The cylindrical bars 49 have an external diameter identical to the diameter of the absorber rods of a rod cluster for controlling the reactivity of the core of the reactor.

As can be seen in FIG. 6, the radially directed arms 48 constitute two sets of two arms 48a and 48b which are arranged and fixed at each of the ends of the body 45, in extension of one another and substantially along a bisector plane of one of the dihedra formed by the support arms 46 of the measurement probes.

The length of the cylindrical body 45 of the inspection rod cluster 10 and of the guide bars 49 is greater than the axial length of the space separating two successive panels 15 of a guide tube, so that, during the movements of the inspection rod cluster 10 inside the guide tube, the guide bars 49 are always engaged with at least two successive guide panels.

In this way, the inspection rod cluster always remains perfectly centered and guided inside the guide tube.

Figure 8:
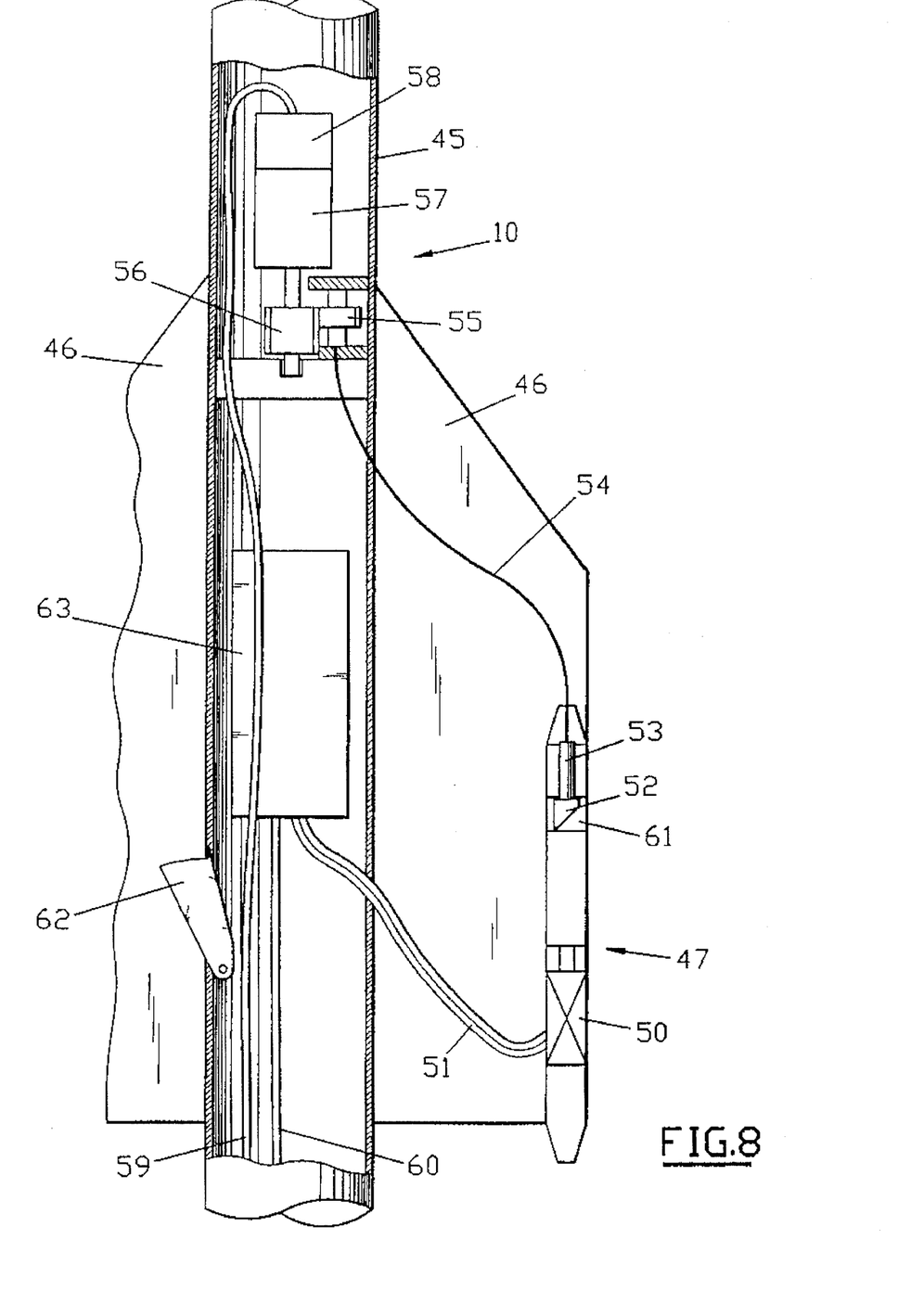
FIG. 8 is a view in elevation showing a checking device according to the invention, including a revolving probe constituting a ladar.

FIG. 8 shows, in more detail, the central part of the inspection rod cluster 10, in a region including the radially directed arms 46 constituting the supports for the probes 47.

For greater clarity, only one arm 46 and one probe 47 have been shown in FIG. 8.

According to a preferred embodiment, the probe 47 constituting a remote measurement sensor is in the form of a ladar making it possible to measure very small distances which may be much smaller than one millimeter, with very high accuracy.

The method of remote optical measurement between a target and a given point, by ladar, consists in sending radiation having periodically variable wavelength towards the target, from a monomode coherent light source supplied with a signal of variable power, placed at the reference point, collecting the radiation backscattered by the target, reinjecting it into the cavity of the light source, and collecting the interference between the backscattered radiation and the radiation output by the source on a photodetector placed at the rear of the source.

The interference, whose frequency is proportional to the delay of the backscattered wave, is representative of the distance between the source and the target.

In the case of dimensional inspection of the bore of a guide element, this method can be employed by using a probe 47 as represented in FIG. 8, connected to an electronic supply and processing module 63.

The probe 47 includes, inside a tubular casing, a diode laser 50 constituting the coherent light source, connected by conductors 51 to the electronic supply and processing module 63 located in the body 45 of the inspection rod cluster, and an optical mirror 52 fixed on a support 53 mounted movably in rotation about an axis parallel to the axis of the tubular support 45 constituting the axis of the probe 47.

The rotary support 53 is connected via a flexible cable 54 to a drive gear 55 engaging with a gear 56 fixed on the output shaft of a reducing gear 57.

An encoder 58 is combined with the reducing gear 57, so as to provide very accurate indications on the angular position of the support 53 and of the mirror 52 reflecting the radiation towards a region of the internal bore of the guide means, which can thus be determined accurately, at each instant during the measurements.

The reducing gear 57 and the encoder 58 are connected to a cable 59 including conductors making it possible to power the reducing gear 57 and return the information from the encoder 58.

The electronic module 63 is connected to a cable 60 including conductors making it possible to supply the module with electric current and return the information from the probe 47 coming from a photodetector combined with this probe.

The cables 59 and 60 pass inside one and the same sheath to constitute the general power and measurement collection cable 12.

During the measurements inside the bore of a guide element of a guide tube, the mirror 52 of the probe is rotated inside the casing of the probe 47, by means of the flexible cable 54 and the reducing gear 57.

The diode laser 50 is powered by the electronic module 63, so as to direct radiation of periodically variable wavelength toward the mirror. The casing of the probe 47 includes a window 61, facing the mirror 52 over the entire periphery of the probe.

It is thus possible to scan the bore of the guide element into which the probe 47 is introduced over its entire periphery, so as to carry out accurate dimensional inspection of this bore, using the ladar measurement of the distance between the light radiation source and the wall of the bore, making it possible to obtain a measurement of the variations in the distance between the wall of the bore and the axis of the probe, during the rotation of the probe.

The measurement signals are processed by the electronic module 63 and sent via the cable 60 to a display and/or recording device located above the level of the cavity of the reactor.

It should be noted that, in the case of using a probe 47 as described, only a part of the probe constituted by the mirror is rotationally mounted on the support of the checking device.

Instead of a probe using the principle of ladar, it is possible to use a probe of another type, for example a probe consisting of an ultrasonic transducer or an eddy current sensor.

In certain cases, it is possible to turn the entire probe about its axis instead of rotating only a part of this probe in order to scan the internal periphery of the bore to be checked.

The term "rotationally mounted probe" mentioned above covers both the case of a probe mounted rotationally in its entirety and the case of a probe including an element which can be rotated in order to carry out the scanning.

As can be seen in FIG. 8, the inspection rod cluster 10 furthermore includes a retractable stop 62 making it possible to stop the inspection rod cluster 10 in position for checking a guide element, during its movement in the axial direction inside a guide tube.

In its extracted position, the stop 62 projects with respect to the outer surface of the body 45 whose outer diameter is slightly less than the diameter of the central free space of the guide panels and of the continuous guide means of a guide tube.

During the movements of the inspection rod cluster 10 inside a guide tube, the stop 62 may successively bear on each of the guide panels, so as to stop the inspection rod cluster 10 in position for checking the guide openings of the panel.

After the guide openings of a guide panel have been checked, the stop 62 is retracted by remote control, so as to make this stop pass through the central free space of the panel which has just been checked. The retractable stop is then released so as to return to its projecting position and stop the inspection rod cluster at the succeeding guide panel.

It is thus possible to check all the guide panels of the discontinuous guide part of the guide tube step by step.

In the continuous guide part of the guide tube, the checking is carried out by holding the stop 62 in its retracted position.

It is clear that the retractable stop 62 may be replaced by a detector such as an inductive or eddy current sensor or by a microcontactor making it possible either to accurately detect the passage of the measurement probes at the level of the regions to be checked or to automatically stop the inspection rod cluster at each of the measurement regions.

Figure 9:
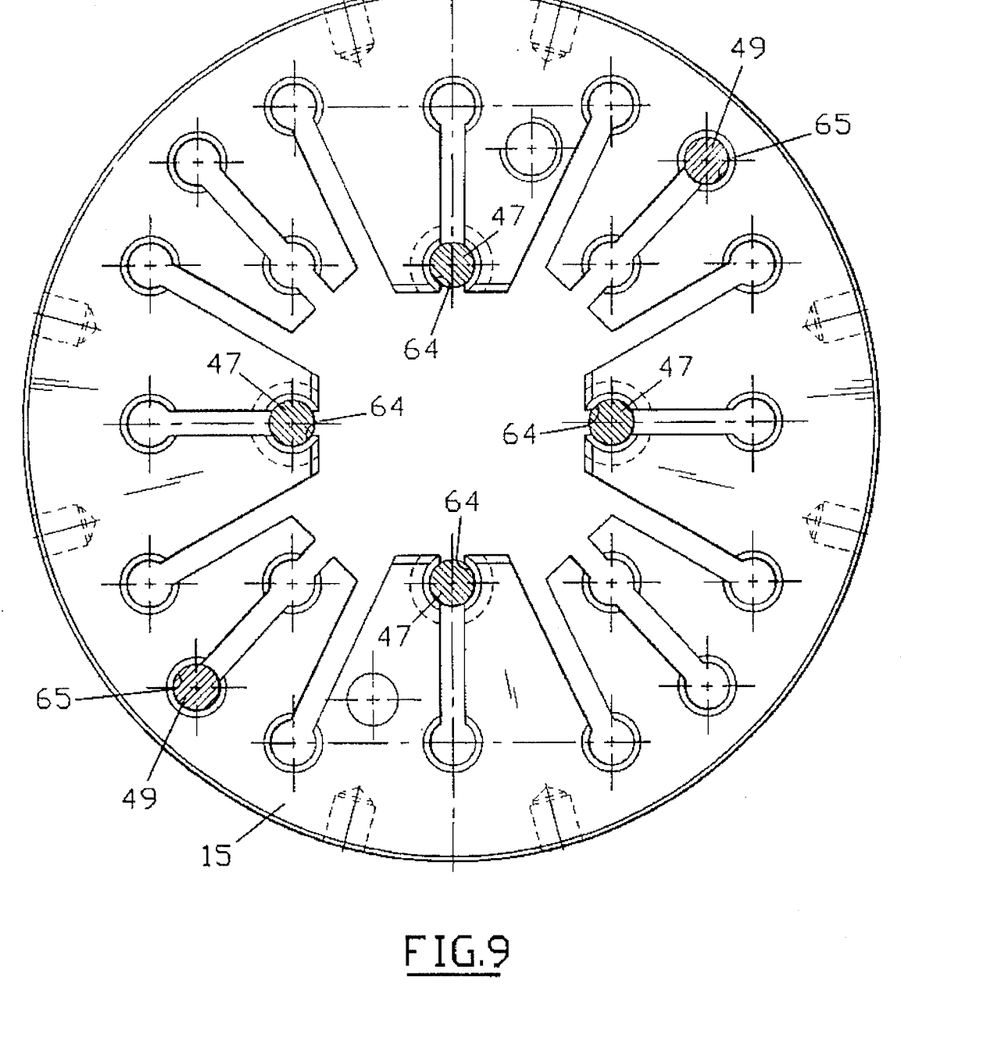
FIG. 9 is a plan view of a guide panel, similar to the panel represented in FIG. 3, showing the positions of the probes of an inspection rod cluster as represented in FIGS. 6 and 7, during the checking of the guide elements.

FIG. 9 represents a guide panel 15 including four internal guide openings 64 arranged at 90° with respect to one another around the axis of the guide tube, which can be checked simultaneously by using the inspection rod cluster as represented in FIGS. 6 and 7.

When the inspection rod cluster 10 is moved axially inside a guide tube including guide panels such as the panel 15, the probes 47 of the inspection rod cluster 10 simultaneously pass through all four guide openings 64 of the guide panel.

The guide bars 49 are introduced into two external openings 65 of the guide panel, so as to accurately position the measurement probes 47 in the internal openings 64.

The checking of the internal openings such as 64 of the guide panels and of the internal bores of the guide sleeves of the continuous guide part of the guide tube as represented in FIG. 4 is of essential importance, and, in some cases, may be sufficient.

Figure 9A:
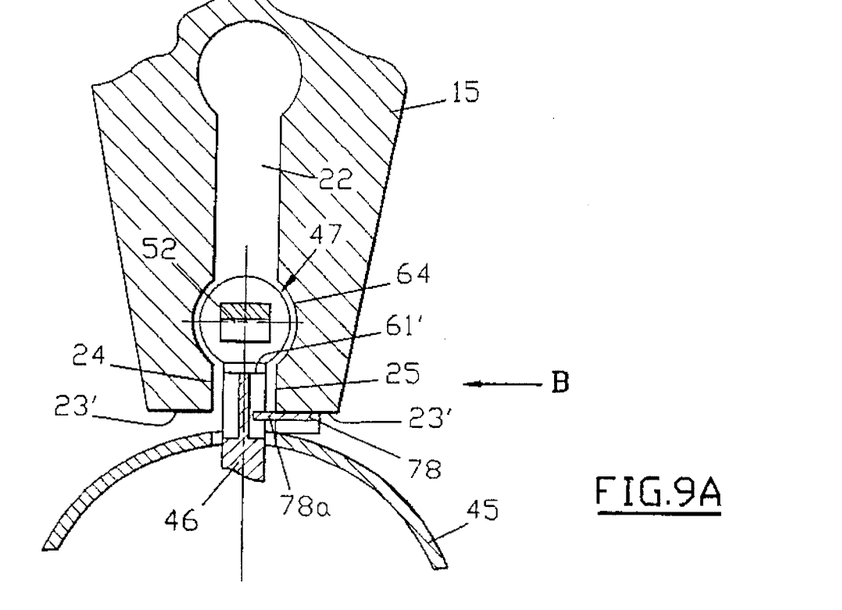
FIG. 9A is a view on an enlarged scale, in section along line A—A in FIG. 9B, of a part of the guide panel represented in FIG. 9 and of a probe in position for checking a guide opening of the panel.
Figure 9B:
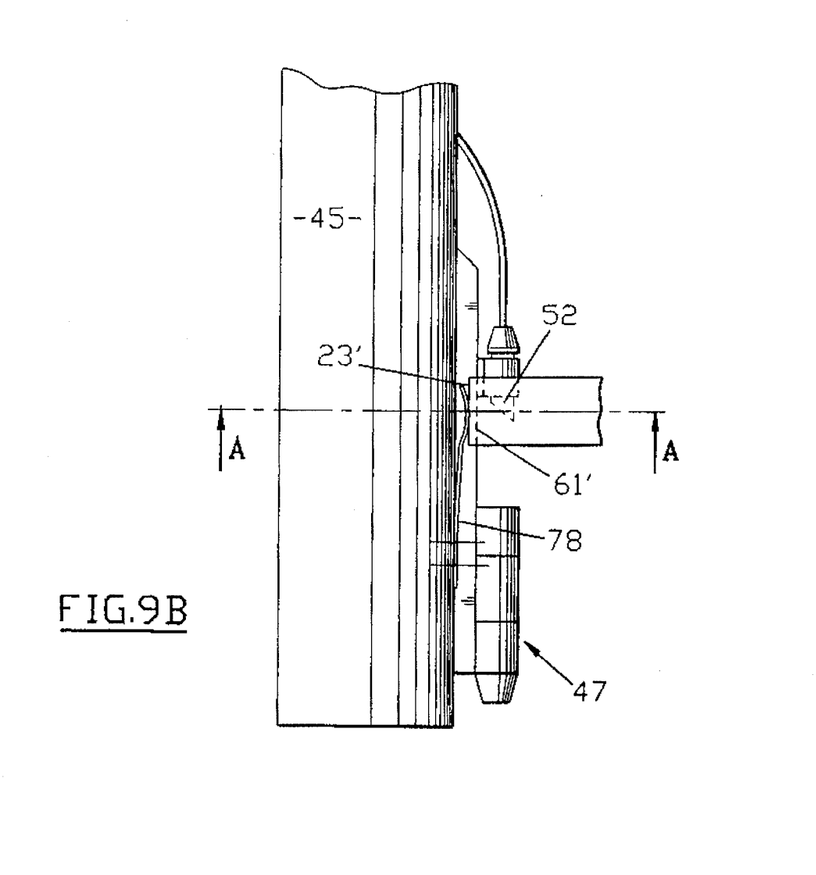
FIG. 9B is a view in the direction of arrow B in FIG. 9A.

FIGS. 9A and 9B represent the elements of an inspection rod cluster of the type described hereinabove with reference to FIGS. 6, 7 and 8, making it possible to calibrate the probe, fitted accurately in the guide elements of the panel 15 and carry out reference measurements on the surfaces of the guide panel which are not subjected to wear in service.

A spring 78 is fixed on the cylindrical body 45 of the inspection rod cluster so as to bear on a part 23' of the internal surface of the bore 17 of the guide panel 15 in order to accurately position the probe 47 in the guide opening 64 of the guide panel. The spring 78 includes a central part 78a tangent to the reference part 23' of the guide panel, extended in the direction of the arm 46 of the probe 47 so as to provide a reference face for the measurement probe 47 exactly in the plane of the part 23' of the internal bore of the guide panel 1.

In addition, the probe 47 defines a calibration surface 61' pointing inwards, i.e. away from the guide opening 64, at the port 61 of the probe 47.

On each revolution of the mirror 52, the calibration surface 61' is scanned by the laser beam, so that a measurement relating to a fixed element can be carried out in order to calibrate the probe.

In addition, the faces 24 and 25 of the slit 22 of the guide panel 15 and the end faces 23' of the slit located by the position of the part 78a of the spring 78 make it possible to verify the measurements, because these faces 23', 24 and 25 undergo no wear in the reactor when in use and thus constitute reference surfaces.

Figure 10:
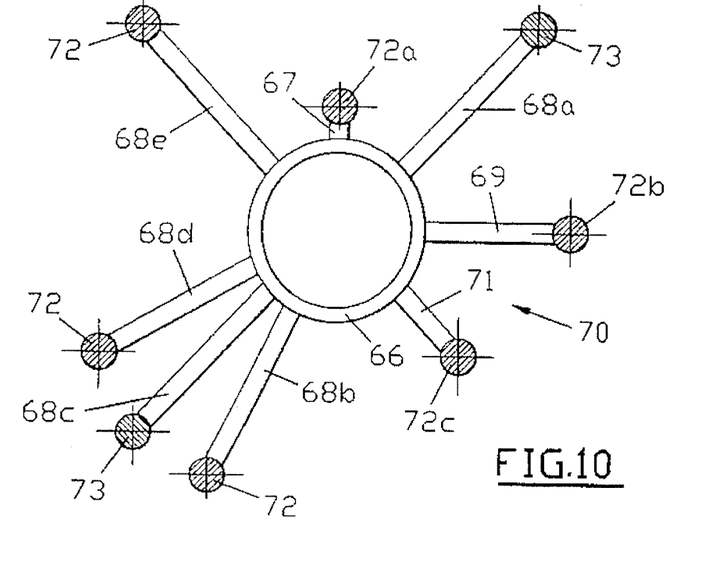
FIG. 10 is a cross-sectional view, similar to FIG. 7, of an alternative embodiment of the inspection rod cluster of a device according to the invention.
Figure 11:
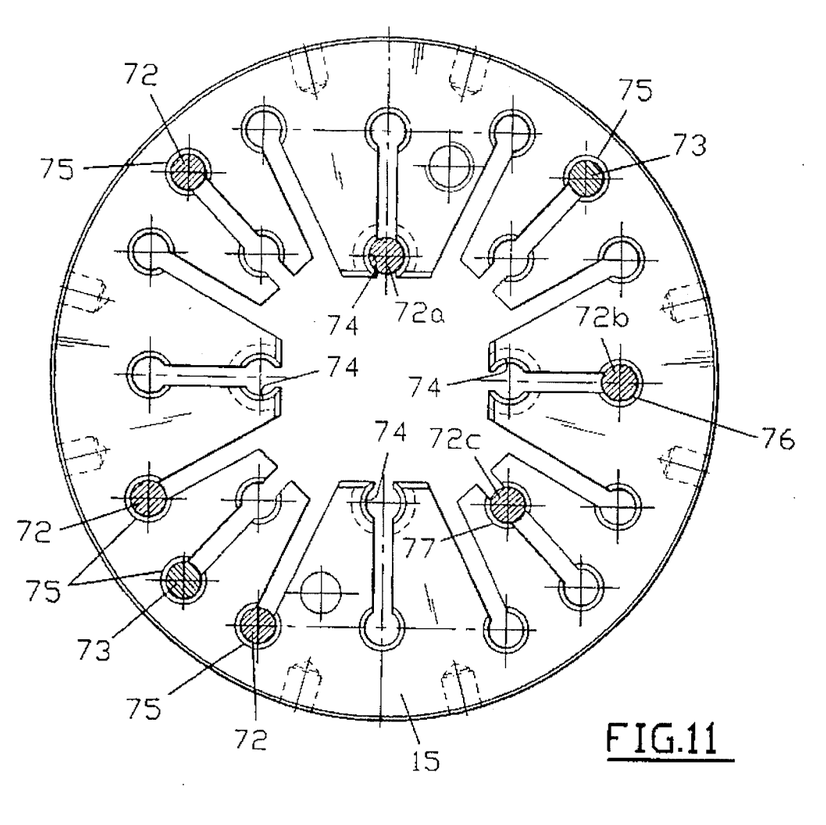
FIG. 11 is a plan view of a guide panel similar to FIG. 3 showing the positions of the probes of an inspection rod cluster as represented in FIG. 10, during the checking of the guide elements.

As can be seen in FIGS. 10 and 11, it is also possible to use an inspection rod cluster making it possible to check all the openings of the guide panels and all the bores of the sleeves and of the tubes of the continuous guide region, by successive passages of the inspection rod cluster through the guide tube, separated by a rotation of the cluster about its axis.

As can be seen in FIG. 10, the inspection rod cluster 70 includes a tubular support 66 and eight arms directed radially with respect to the tubular support 66, and having outer end of which carry either a measurement probe 72 or a guide bar 73.

The arm 67, which is shorter, carries a probe 72a which can be placed in the checking position inside an internal opening 74 of a guide panel 15, as represented in FIG. 11.

The longer arms carry, at their external end opposite the support 66, a measurement probe 72, as regards the arms 68b, 68d and 68e, and a guide bar 73 as regards the arms 68a and 68c.

The arm 69, which is slightly shorter than the arms 68a, . . . , 68e, carries a measurement probe 72b.

Finally, the arm 71 whose length is intermediate between the length of the arm 67 and the length of the arm 69 carries a measurement probe 72c.

As can be seen in FIG. 11, when the inspection rod cluster 70 is in position inside a guide tube, in the discontinuous part of this guide tube, the probe 72a can check an internal opening 74 of the guide panel 15, it being possible for the three probes 72 to check the three external openings 75 of the guide panel, the probe 72b can check one opening 76 and the probe 72c one opening 77.

The guide bars 73 are engaged in two external openings 75.

The inspection rod cluster 70 therefore makes it possible to simultaneously check six openings (or six bores in the continuous part of the guide tube) situated at different distances from the axis of the guide tube.

By turning the inspection rod cluster 70 through 90° around the axis of the support 66, between two passages of the cluster inside the guide tube along its entire length, six new series of openings of the guide panels (or six new bores of the continuous guide part of the guide tube) are checked, because the arrangement of the openings of the guide panels is symmetrical with respect to two diameters of the guide panel extending at an angle of 90° from each other.

It is possible to check all the openings of the guide panels (or all the openings of the continuous part) of a guide tube in four passages separated by a 90° rotation of the inspection rod cluster about its axis.

The rotation of the inspection rod cluster may be carried out on the support carriage 9 in line with the guide tube which is being checked.

An operation of checking a guide tube for the upper internals 4 of a nuclear reactor in position on their inspection stand 3 in the cavity of the reactor will now be described.

The bearing carriage 9 equipped with an inspection rod cluster of a type determined as a function of the checking to be carried out is lowered onto the bottom 2 of the cavity 1.

The inspection rod cluster may, for example, be of the type represented in FIGS. 6 and 7 or of the type represented in FIG. 10.

The probes and the support carriage 9 are connected to a control and command station situated above the upper level of the cavity, by the set of cables 12.

The carriage is moved over the bottom of the cavity in a controlled manner, using the video camera 43 which makes it possible to visualize a grid drawn on the bottom of the cavity.

The carriage is stopped in a position such that the inspection rod cluster 10 is aligned with a predetermined guide tube 8'.

The jack 42 is controlled so as to engage the sentencing head 41 on studs of the upper core plate 6 constituting the lower part of the internals.

The bearing carriage 9 and the inspection rod cluster 10 are thus positioned and held in position.

A mast or a command rod 11 is introduced into the upper part 8'*a* of the guide tube 8', from the bridge situated at the upper level of the cavity 1 of the reactor.

The mast or command rod 11 is lowered into the central part of the guide tube, so as to project below the upper core plate 6 to engage inside the spider assembly 10*a* of the inspection rod cluster 10.

By simply pushing on the mast or command rod, the inspection rod cluster 10 is fastened to the mast 11.

The mast 11 is moved in the vertical direction along the axis of the guide tube 8', such that the lower part of the inspection rod cluster 10 engages in the guide tube 8'.

The inspection probes are powered and rotated. The continuous part of the guide tube is checked and each of the guide panels of the discontinuous guide part of the guide tube is then checked in succession.

The measurements made by the probes and the angular position of the probe during the measurements are transmitted to the control and command station above the cavity of the reactor, via cables connected to the electronic module 63 and to the probes 47.

After the guide tube 8' has been scanned over its entire length by moving the inspection rod cluster 10 upwardly in the axial direction, the inspection rod cluster 10 is again lowered to its starting position on the support 36 of the carriage 9, the cluster 10 still being fixed to the mast 11.

In the case of a check carried out by using an inspection rod cluster as represented in FIGS. 6 and 7, the mast is separated from the inspection rod cluster and the carriage 9 and the inspection rod cluster are moved to a new guide tube to be checked, after having separated the centering head 41 from the positioning studs of the upper core plate 6.

In the case of an inspection rod cluster such as the inspection rod cluster 70 represented in FIG. 10, the cluster 70 is turned through a quarter turn on the carriage before carrying out a second movement along the entire length of the guide tube.

As indicated hereinabove, the checking of all the openings and bores of the guide tube is carried out during four successive displacements of the inspection rod cluster 70 over the entire length of the guide tube, the inspection rod cluster being turned through 90° between two successive movements inside the guide tube.

During the movement of the inspection rod cluster downwards inside the guide tube, for returning it to the carriage 9, the pusher-puller 38 continuously tensions the set of cables 12, such that any blockage during the downward movement of the inspection rod cluster is avoided.

The device according to the invention therefore makes it possible to very accurately check the openings and bores of the guide tubes of the upper internals of a pressurized water nuclear reactor by using a device which is simple, rigid and perfectly guided inside the guide tube.

Furthermore, the check which is carried out from the lower part of the internals does not require any dismantling for passage of the checking means.

The inspection rod clusters including measurement probes and guide bars may have different arrangements from those which have been described, and there may be different numbers of them.

Although probes allowing remote measurements by the ladar method have significant advantages as regards the accuracy of the measurements, it is possible to use probes functioning on another principle, such as ultrasonic or eddy current probes, to carry out the remote measurements.

The invention applies generally to the checking of the guide elements of the upper internals of a nuclear reactor.

I claim:

1. Device for checking guiding elements of a guide tube in the upper internals of a pressurized water nuclear reactor arranged underwater in a cavity, said guiding elements being arranged inside said guide tube having a vertical axis in a checking position, and being comprised of guiding openings passing through horizontal plates arranged spaced apart from each other axially of said guide tube and of bores of tubular sleeves with vertical axes, said guiding openings and said bores being aligned along a plurality of vertical axial directions, said device including an inspection rod cluster having a spider assembly for attachment to a handling mast, support elements for inspection probes capable of being moved axially inside said guiding openings and said bores of said guiding elements, said inspection probes each being mounted for rotating movement on one of said support elements, about an axis parallel to the axis of said guide tube, and means for rotating said inspection probes, wherein said inspection rod cluster includes:

(a) a cylindrical body having a diameter smaller than a diameter of a central bore of said guide tube; and (b) a plurality of radially extending arms fixed around said cylindrical body in determined angular and axial positions and each having a part remote from said cylindrical body, said part carrying an inspection probe arranged rotatively.

2. Checking device according to claim 1, further including at least two cylindrical guide bars each fixed to the end of a radially extending arm opposite said cylindrical body, and which is solidly attached to said cylindrical body.

3. Checking device according to claim 1 or 2, wherein each of said inspection probes includes a diode laser and an optical mirror which is mounted rotationally about an axis of the probe parallel to the axis of said cylindrical body, so as to intercept radiation coming from said diode laser and to scan the internal surface of said guiding openings and said bores of said guiding elements of said guide tube with said radiation and to return towards said diode the radiation reflected by the surface of said guiding openings and said bores.

4. Checking device according to claim 3, further including an electronic module fixed to the inside of said cylindrical body and including means for processing signals coming from the diode laser associated with a photodetector.

5. Checking device according to claim 3, wherein said mirror is fixed on a support solidly attached to a first end of a flexible cable, an opposite end of said cable being solidly attached to a drive gear driven in rotation by a reducing gear located inside said cylindrical body.

6. Checking device according to claim 1, wherein a means for stopping said inspection rod cluster at the horizontal plates of said guiding elements is mounted on said cylindrical body.

7. Checking device according to claim 1, wherein said cylindrical body carries, in the vicinity of each of said arms, a spring for positioning against one face of a plate traversed by guide openings, having a part constituting a reference surface for a measurement probe.

8. Device according to claim 2, wherein said inspection rod cluster includes four shorter arms placed substantially at 90° to one another around said cylindrical body, each of said arms carrying one inspection probe, and two pairs of arms of greater length in the radial direction than said shorter arms, arranged in extension of one another on either side of the body of said inspection rod cluster and carrying at their ends two axially directed guide bars.

9. Checking device according to claim 2, wherein said inspection rod cluster includes a plurality of arms of different lengths distributed around said cylindrical body, two pairs of arms of greater length carrying at their ends axially directed guide bars, and the other arms carrying measurement probes.

10. Checking device according to claim 8 or 9, wherein said guide bars have an axial length greater than the distance separating two successive horizontal plates pierced with openings for said guiding elements of said guide tube.

11. Checking device according to claim 1, further including a carriage which can be moved over the bottom of the cavity, carrying a support for said inspection rod cluster in the vertical position and said handling mast carrying at its end means for attachment to said spider assembly.

12. Checking device according to claim 11, wherein said carriage includes a vertically movable head including openings for engagement on centering studs of the lower part of said upper internals, so as to ensure precise positioning of said carriage under said internals in said cavity.

13. Checking device according to claim 11, wherein said carriage carries guide means and displacement means for a set of cables connected to one end of said inspection rod cluster and to a control and command station above said cavity at its other end of said inspection rod cluster.

14. Checking device according to claim 11, wherein said carriage carries cameras for visualizing the bottom of said cavity and the upper part of said inspection rod cluster in a vertical position on said carriage.

15. Method for checking guiding elements of a guide tube in upper internals of a pressurized water nuclear reactor arranged underwater in a cavity, said guiding elements being arranged inside said guide tube having a vertical axis in a checking position, and being comprised of guiding openings passing through horizontal plates spaced apart from each other axially of said guide tube and bores of tubular sleeves with vertical axes, said guiding openings and said bores being aligned along a plurality of vertical axial directions, said device including an inspection rod cluster having a spider assembly for attachment to a handling mast, support elements for inspection probes capable of being moved axially inside said guiding elements of said guide tube, said inspection probes each being mounted for rotational movement on one of said support elements, about an axis parallel to an axis of said guide tube and means for rotating the probes, said method comprising the steps of:

(a) arranging, below and in line with said guide tube of said upper internals, an inspection rod cluster including a cylindrical body having a diameter smaller than a diameter of a free central bore of said guide tube and a plurality of radially directed arms fixed around said cylindrical body in determined angular and axial positions, each of said arms carrying a rotary inspection probe;

(b) introducing said handling mast through an upper end into said guide tube;

(c) connecting one end of said handling mast to said spider assembly below said upper internals;

(d) moving said inspection rod cluster upwards inside said guide tube by raising said handling mast; and (e) checking said guiding elements with said inspection probes during upward movement of said inspection rod cluster inside said guide tube.

16. Checking method according to claim 15, comprising the step of rotating said inspection rod cluster about the axis of said cylindrical body through a certain angle, below said upper internals between two successive operations of upward movement of said inspection rod cluster inside said guide tube, and of checking inside said guide tube.

17. Checking method according to claim 15 or 16, comprising the steps of checking said guide elements by remote radar measurement.

\* \* \* \* \*